United States Patent
Berrigan et al.

[11] Patent Number: 6,139,308
[45] Date of Patent: Oct. 31, 2000

[54] UNIFORM MELTBLOWN FIBROUS WEB AND METHODS AND APPARATUS FOR MANUFACTURING

[75] Inventors: Michael R. Berrigan, Oakdale, Minn.; James F. Dyrud, New Richmond, Wis.; Stanley C. Erickson, Stillwater, Minn.; Luther E. Erickson, Grant, Minn.

[73] Assignee: 3M Innovative Properties Company, St. Paul, Minn.

[21] Appl. No.: 09/181,205

[22] Filed: Oct. 28, 1998

[51] Int. Cl.[7] .................................................. A01J 21/00
[52] U.S. Cl. ....................... 425/224; 425/317; 425/440; 425/441; 425/447; 264/145; 264/159; 264/171.29; 264/209.2
[58] Field of Search .................................... 425/224, 317, 425/440, 441, 447; 264/145, 159, 171.29, 209.2

[56] References Cited

U.S. PATENT DOCUMENTS

| | | |
|---|---|---|
| Re. 28,102 | 8/1974 | Mayhew . |
| Re. 34,328 | 8/1993 | Upmeier . |
| 3,613,678 | 10/1971 | Mayhew . |
| 3,686,050 | 8/1972 | Hubin et al. . |
| 3,758,373 | 9/1973 | Rich . |
| 3,784,427 | 1/1974 | Griffin . |
| 3,870,478 | 3/1975 | Rohlfing . |
| 3,905,734 | 9/1975 | Blair . |
| 3,909,174 | 9/1975 | Blair et al. . |
| 3,955,773 | 5/1976 | Blinn . |
| 3,971,373 | 7/1976 | Braun . |
| 4,032,688 | 6/1977 | Pall . |
| 4,215,682 | 8/1980 | Kubik et al. . |
| 4,298,649 | 11/1981 | Meitner . |
| 4,301,203 | 11/1981 | Keuchel . |
| 4,419,993 | 12/1983 | Petersen . |
| 4,536,440 | 8/1985 | Berg . |
| 4,547,420 | 10/1985 | Krueger et al. . |
| 4,592,815 | 6/1986 | Nakao . |
| 4,729,371 | 3/1988 | Krueger et al. . |
| 4,795,668 | 1/1989 | Krueger et al. . |

(List continued on next page.)

FOREIGN PATENT DOCUMENTS

| | | |
|---|---|---|
| 0 494 091 B1 | 4/1987 | European Pat. Off. . |
| 0 518 693 A1 | 12/1992 | European Pat. Off. . |
| WO 9603194 A1 | 2/1996 | WIPO . |

OTHER PUBLICATIONS

IVF Product Literature, CH–8212 Neumausen am Rheinfall/Schwe, IVF Maschinenfabrik Schaffhuse, AMachine for cotton wool ribbons, type 165, @ 3 pgs. (No Date).
Wente ASuperfine Thermoplastic Fibers, @ *Industrial and Engineering Chemistry*, 48, 1342–1346 (1956).

*Primary Examiner*—Christopher Raimund
*Attorney, Agent, or Firm*—Karl G. Hanson; Kevin Raasch

[57] ABSTRACT

Multilayer meltblown fibrous webs, as well as apparatus and methods of forming the webs. The webs are produced on a rotating collector that also moves parallel to its longitudinal axis. The webs are thus formed in a helical process, and the resulting tubular web is separated in a direction parallel to a helix angle. By separating the tubular web in a direction parallel to the helix angle, a flat multilayer meltblown fibrous web is provided that allows for incorporation of feathered edges formed during the article's manufacture.

21 Claims, 8 Drawing Sheets

U.S. PATENT DOCUMENTS

| | | |
|---|---|---|
| 4,798,850 | 1/1989 | Brown . |
| 4,807,619 | 2/1989 | Dyrud et al. . |
| 4,809,413 | 3/1989 | Upmeier . |
| 4,827,924 | 5/1989 | Japuntich . |
| 4,883,547 | 11/1989 | Japuntich . |
| 4,988,560 | 1/1991 | Meyer et al. . |
| 5,025,052 | 6/1991 | Crater et al. . |
| 5,057,710 | 10/1991 | Nishiura et al. . |
| 5,062,421 | 11/1991 | Burns et al. . |
| 5,099,026 | 3/1992 | Crater et al. . |
| 5,141,699 | 8/1992 | Meyer et al. . |
| 5,248,366 | 9/1993 | Rasmussen . |
| 5,307,796 | 5/1994 | Kronzer et al. . |
| 5,411,576 | 5/1995 | Jones et al. . |
| 5,429,847 | 7/1995 | Ando et al. . |
| 5,472,481 | 12/1995 | Jones et al. . |
| 5,496,507 | 3/1996 | Angadjivand et al. . |
| 5,503,782 | 4/1996 | Dyrud et al. . |
| 5,582,907 | 12/1996 | Pall . |
| 5,586,997 | 12/1996 | Pall et al. . |
| 5,652,050 | 7/1997 | Pall et al. . |
| 5,706,804 | 1/1998 | Baumann et al. . |
| 5,714,073 | 2/1998 | Pall et al. . |

UNIFORM MELTBLOWN FIBROUS WEB AND METHODS AND APPARATUS FOR MANUFACTURING

The present invention pertains to multilayer meltblown fibrous webs, methods of manufacturing such webs, and apparatus for manufacturing multilayer meltblown fibrous webs.

BACKGROUND

The manufacture of meltblown fibrous webs has been discussed in many references, including, Wente, Van A., *Superfine Thermoplastic Fibers*, 48 Industrial Eng. and Chem. 1342–46 (1956); Report No. 4364 of the Naval Research Laboratories, published May 25, 1954, entitled *Manufacture of Superfine Organic Fibers*, by Wente, V. A., Boone, C. D., and Fluharty, E. L.; and U.S. Pat. No. 3,971,373 to Braun.

In making meltblown fibrous webs, a thermoplastic polymer or resin is commonly extruded through a row of small, side-by-side orifices into a high velocity gaseous stream that attenuates the emerging material into fibers. The gaseous stream creates turbulence that randomly entangles the fibers to form a coherent nonwoven web on a collector. The collector may be a moving flat belt or rotating cylindrical screen or drum. The resulting nonwoven web is transferred from the collector to a temporary storage roll.

Known processes have a couple drawbacks, namely, they can produce significant waste as a process by-product and they can produce non-uniformities across the web.

Waste (also referred to as weed) is commonly produced at the web edges when manufacturing meltblown fibrous webs. The waste or weed results because the web edges are typically "feathered", meaning the edges taper off and do not have the same weight and density as the central portion of the web. The feathering stems from fiber dispersal at the web edges. To eliminate this variation in weight and density, the web edges typically are trimmed off and then discarded as waste, while the central portion of the web is retained for further processing. The wasted material adds to processing costs, especially when in-line web processing is desired.

Known meltblown fibrous webs are typically mono-layer webs that, by definition, have only a single layer. Mono-layer meltblown fibrous webs often suffer from non-uniformities over their cross-web dimension due, for example, to variations in orifice diameter. The variations in orifice diameter can cause non-uniform fiber deposition that, in turn, causes variations in the basis weight in the cross-web dimension. The basis weight is the weight per unit area of the mono-layer web, and it is commonly adjusted by varying the polymer extrusion rate or the collector speed or both. For example, if a higher basis weight web is desired, the collector speed can be reduced and/or the extrusion rate can be increased. Conversely, if a lower basis weight web is desired, the collector speed can be increased and/or the extrusion rate can be decreased.

One approach to overcoming variations in basis weight include laminating multiple webs together using agents such as adhesives or resins and/or by physical processing such as welding. The variations in the multiple webs then preferably average out the non-uniformities such that the minimum acceptable basis weight is achieved over the entire laminated web. One disadvantage to this approach is that some areas of the web can have an excessive basis weight and hence unnecessary amounts of web material. The unnecessary material, as well as the laminating agents and/or processing needed to laminate the webs to form the multi-web products adds to production costs and increases complexity. Furthermore, the agents and/or welds used to laminate the layers can adversely affect the resulting articles' conformability and flexibility.

Attempts to employ tubular fibrous web processes to achieve a flat web have typically involved forming the tubular meltblown fibrous web and compressing the tube to obtain a flat web without feathered edges. Alternatively, the tubular web may be slit longitudinally so that the tube is opened, thereby producing a flat web with two machine-cut edges. Two such approaches are described in U.S. Pat. No. 3,909,174 (Blair et al.) and U.S. Pat. No. 4,032,688 (Pall). A disadvantage of these processes is that variations in web thickness may often be helical in nature. As a result, slitting the web longitudinally often causes banded variations in the web density, which variations are located at an angle, commonly referred to as a "bias angle," with respect to the web centerline.

SUMMARY OF THE INVENTION

The present invention is directed to overcoming the noted drawbacks in known methods for making meltblown fibrous webs. In one aspect, the present invention provides a new apparatus for manufacturing a meltblown fibrous web. The new apparatus includes (i) a collector that has a generally cylindrical forming surface and (ii) a source that is capable of directing meltblown fibers at the forming surface. The generally cylindrical forming surface can rotate about a longitudinal axis and can simultaneously move parallel to the longitudinal axis, such that a selected point on the forming surface can move in a helical pattern about and along the longitudinal axis from a first end of the collector to a second end of the collector. The helical pattern defines a helix angle relative to the longitudinal axis. The apparatus also includes (iii) a separator that can separate a tubular meltblown fibrous web formed on the forming surface in a direction generally parallel to the helix angle. The separator thus converts the tubular meltblown fibrous web into a non-tubular or flat meltblown fibrous web.

In a second aspect, the present invention provides a method of manufacturing a meltblown fibrous web using a collector having a generally cylindrical forming surface. The forming surface is rotated about a longitudinal axis and simultaneously moves longitudinally in the direction of the longitudinal axis such that a selected point on the forming surface moves in a helical pattern about and along the longitudinal axis from a first end of the collector to a second end of the collector. The helical pattern defines a helix angle relative to the longitudinal axis. Meltblown fibers are directed at the forming surface as the forming surface rotates and moves longitudinally, such that a tubular meltblown fibrous web is formed on the forming surface. The tubular meltblown fibrous web is then separated along a direction generally parallel to the helix angle to convert the tubular meltblown fibrous web into a non-tubular or flat meltblown fibrous web.

In a third aspect, the present invention provides a multi-layer meltblown fibrous web that has a plurality of interconnected layers that contain meltblown fibers. At least one of the fiber-containing layers has a feathered edge. The web also has two separated edges. The feathered edge is located between the separated edges, and the separated edges and the feathered edge are generally parallel to each other. The multilayer meltblown fibrous web may be used in a variety of articles such as filters for masks or respirators.

The multilayer meltblown fibrous webs of the present invention are produced on a collector having a forming surface in the general shape of a cylinder where the forming surface rotates about the longitudinal axis of the cylinder. While the forming surface rotates as such, it is simultaneously advanced parallel to and along the longitudinal axis. As a result, any particular point on the forming surface moves along a helical path during web manufacture.

A meltblown fiber source is directed at the forming surface along at least a portion of the longitudinal length of the collector, thereby forming a layer of meltblown fibers on the forming surface. The forming surface typically completes at least one rotation about the longitudinal axis in the time required to advance the forming surface along the length of the meltblown fiber source. Where the forming surface completes two or more rotations in the time required to advance the forming surface along the length of the collector, a multilayer tubular web is built-up on the forming surface.

Because the forming surface rotates about the longitudinal axis while simultaneously advancing parallel to the longitudinal axis, the feathered edges in each layer of meltblown fibers are formed in a helical pattern on the cylindrical forming surface.

A separator is used to separate the tubular meltblown fibrous web in a direction oriented at an oblique angle relative to the longitudinal axis of the cylindrical forming surface. That oblique angle is equal to the helix angle formed by the feathered edges during manufacture of the meltblown fibrous web. The flat meltblown fibrous web formed after separating the tubular multilayer meltblown fibrous web along the helix angle includes two separated edges that have a thickness substantially the same as the thickness of the remainder of the web and does not require trimming or further processing before use of the web in other processes.

By separating the tubular multilayer meltblown fibrous web in a direction generally parallel to the helix angle to produce a flat multilayer meltblown fibrous web, variations in the density or weight of the meltblown fibrous web caused by the feathered edges are parallel to the edges of the formed flat web. This is in direct contrast with known tubular meltdown fibrous webs that are slit longitudinally, causing the feathered edges to cross the web at a bias angle with respect to the flat web centerline.

The meltblown fibrous webs of the present invention are different from known webs because of their multilayer composition in which the feathered edges are incorporated into the web and are disposed generally parallel to the web's separated edges. Because the meltblown fibrous articles are commonly formed from multiple layers of meltblown fibers, variations in basis weight contributed by the feathered edges can be significantly reduced. The web layers that terminate in feathered edges form only a fraction of the overall basis weight of the web as a whole. In addition, any variations in the basis weight contributed by non-uniformities across the die or dies used to form the articles may also be reduced because of the multilayer nature of the articles. The helical nature of the process will naturally displace those variations over the width of the web such that they will not typically be aligned throughout the web thickness. Because the process causes the feathered edge to be included in the resulting web, the invention is advantageous in that it eliminates waste production stemming from the previous need to remove the feathered edge from the product.

These and other features and advantages of the meltblown fibrous webs, apparatus for manufacturing them, and methods for manufacturing them are discussed below in more detail.

GLOSSARY

In reference to the invention, the following terms are defined as set forth below:

"collector" means an apparatus that is capable of collecting meltblown fibers;

"feathered edge" means the portion of a meltblown fibrous web layer in which the density and basis weight of the web tapers off due to fiber dispersal;

"forming surface" means that portion of a collector on which meltblown fibers are deposited after exiting a meltblown fiber source;

"helical pattern" means a pattern formed in the shape of helix, in other words, similar to the path followed by the threads of a screw;

"helix angle" means the angle formed by the helical pattern relative to a plane perpendicular to the longitudinal axis;

"interconnected layers" means meltblown fiber layers that are connected to each other by, for example, fiber entanglement between fibers in the different layers, an agent introduced to connect the layers (for example, a resin, adhesive, etc.), and/or processing (for example, pin, welding, etc.);

"intermediate layer" means a meltdown fiber layer located between the first and second layers of a multilayer meltblown fibrous web;

"longitudinal axis" means the central axis about which the cylindrical forming surface rotates;

"machine direction" means the direction of travel of the forming surface during formation of a tubular meltblown fibrous web;

"meltblown fiber layer" and its variations means a nonwoven fibrous structure that contains meltblown fibers and possibly other ingredients formed on a collector or other surface during one pass past a source of meltblown fibers;

"meltblown fibrous web" means a nonwoven fibrous structure that contains meltblown fibers and possibly other ingredients and that has sufficient integrity to be handlable by itself as a mat; and "separated edge" means an edge of a multilayer meltblown fibrous web that is physically separated from another edge of the web by any suitable method, for example, slitting, tearing, etc.

DETAILED DESCRIPTION OF PREFERRED EMBODIMENTS

Figure 1:
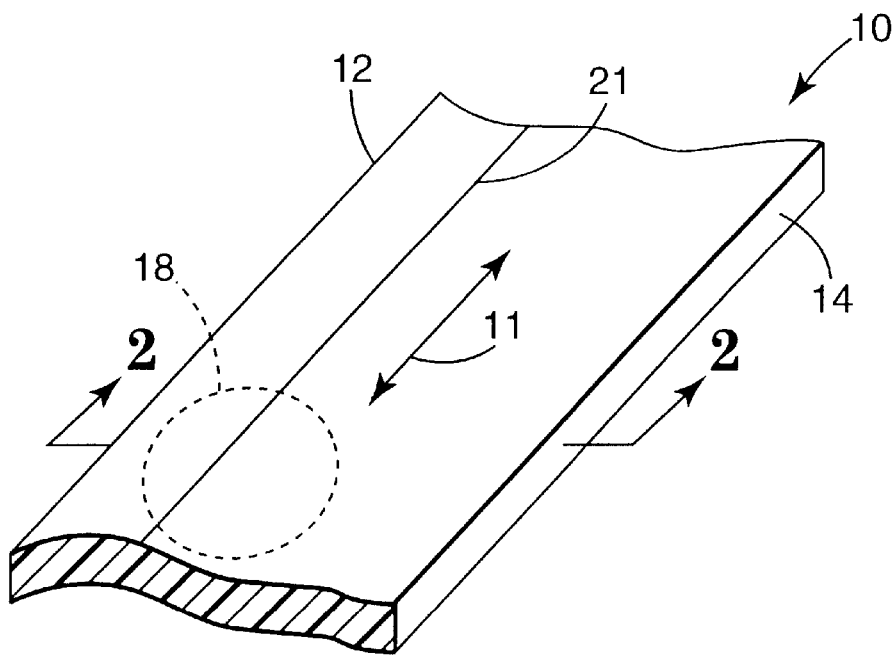
FIG. 1 is a perspective view of a portion of one multilayer meltblown fibrous web 10 according to the present invention which has two separated edges 12 and 14.

The present invention provides multilayer meltblown fibrous articles where the meltblown fiber layers can terminate in a feathered edge that is generally parallel to the machine direction of the layers of meltblown fibers in the article. The feathered edge of each meltblown fiber layer does not need to be trimmed off and can be incorporated into the article. In many instances, the multilayer meltblown fibrous article is provided in the form of a web that has a centerline aligned with the machine direction and that is located between two separated edges. In web form, the feathered edges are generally parallel to the web centerline.

The meltblown fibers used in the present invention may be essentially any size or diameter, provided that the fibers can be meltblown to produce webs and articles as discussed herein. Preferred meltblown fibers may be microfibers, depending on the application. "Microfibers" are fibers that have an average diameter of about 10 micrometers ($\mu$m) or less, measured generally transverse to the longest dimension of the fiber. Microfibers may offer improved filtration efficiency and other beneficial properties when used in various articles.

In some applications, oriented meltblown fibers may be desired to increase web strength. Examples of processes useful in forming oriented meltblown fibers can be found in U.S. Pat. No. 4,988,560 (Meyer et al.) and U.S. Pat. No. 5,141,699 (Meyer et al.). The fibers may be made from a single homogeneous polymeric material, or they may include one or more polymers in, for example, bicomponent form as described in U.S. Pat. No. 4,547,420 (Krueger et al.) or U.S. Pat. No. 4,729,371 (Krueger et al.).

Electric charge can be imparted to nonwoven meltblown fibrous webs to improve their filtration performance using techniques described in, for example, U.S. Pat. No. 5,496,507 (Angadjivand et al.), U.S. Pat. No. 5,057,710 (Nishiura et al.), U.S. Pat. No. 4,592,815 (Nakao), and U.S. Pat. No. 4,215,682 (Kubik et al.). Fibers that include polypropylene may be suitable receiving and retaining a persistent electric charge. Another polymer that may be suitable for making the electret meltblown fibers is poly(4-methyl-1-pentene) alone or in combination with polypropylene.

The fiber materials may contain additives to enhance filtration performance, such as the additives described in U.S. Pat. Nos. 5,025,052 and 5,099,026 (Crater et al.), and U.S. patent application Ser. No. 08/514,866, now U.S. Pat. No. 5,908,598 (Rousseau et al.), and may also have low levels of extractable hydrocarbons to improve performance; see, for example, U.S. patent application Ser. No. 08/941,945 (Rousseau et al.) pending. Fibrous webs also may be fabricated to have increased oily mist resistance as discussed in U.S. Pat. Nos. 5,411,576 and 5,472,481 (Jones et al.), and in U.S. patent application Ser. No. 08/941,270, pending, and Ser. No. 08/941,864 now U.S. Pat. No. 6,068,799 (Rousseau et al.), or they may be fabricated in conjunction with other layers to inhibit liquid passage as described in U.S. Pat. No. 5,706,804 (Baumann et al.). As described in a number of the patents cited in this paragraph, the fibers may contain certain melt processable fluorocarbons, for example, fluorochemical oxazolidinones and piperazines and compounds or oligomers that contain perfluorinated moieties. The use of such additives can be particularly beneficial to the performance of an electrically charged web as a filter.

The discussions below assume that the methods of manufacturing the web and the apparatus used in the method are operating in a steady-state continuous process in which the collector is moving at a constant rate both rotationally and longitudinally. During process changes, however, some of the spatial relationships may not hold. For example, if the helix angle is altered by changes in the collector rotation rate or the rate at which the tubular web advances along the collector, the feathered edges may not be parallel to the separated edges until the process returns to a steady state and the spatial relationships are re-established. Even during such process changes, however, the feathered edges may still be generally parallel to the separated edges.

FIG. 1 depicts a portion of one illustrative multilayer meltblown fibrous web 10. The web 10 can be provided in a discrete length in the machine direction, or it can be considered to have an endless length in the machine direction during manufacture.

The web 10 preferably includes a centerline 11 and two separated edges 12 and 14 that are formed during manufacture of the flat web 10 from a tubular web as discussed below. The separated edges 12 and 14 are preferably generally parallel to the web centerline 11 and to each other. Furthermore, the machine direction, as defined by the motion of a selected point on the forming surface of the collector used to manufacture the web 10, is also preferably parallel to the centerline 11 and the separated edges 12 and 14.

The thickness or basis weight of the web is preferably generally constant between the separated edges. This feature of the meltblown fibrous webs of the invention is in direct contrast to the webs formed by conventional processes in which the thickness or basis weight generally tapers off near the web edges.

The separated edges 12 and 14 are depicted as being straight lines in FIG. 1, but edges 12 and 14 could also be provided in other shapes such as sinusoidal or other waveforms. In any event, however, the web edges 12 and 14 will generally extend in directions that are parallel to the web centerline 11.

The techniques used to form the separated edges 12 and 14 can vary. In some instances the edges may be slit using techniques including, but are not limited to, knife slitting, laser slitting, water jet slitting, ultrasonic slitting, hot wire slitting, flame slitting, etc. As an alternative to slitting, the web edges 12 and 14 can be formed in a rotary die cutting process, or they can be formed by controlled tearing of the web in a predetermined pattern. For example, it may be helpful to perforate, crease, or otherwise modify the tubular web before tearing to assist in controlling the tear direction.

Figure 2:
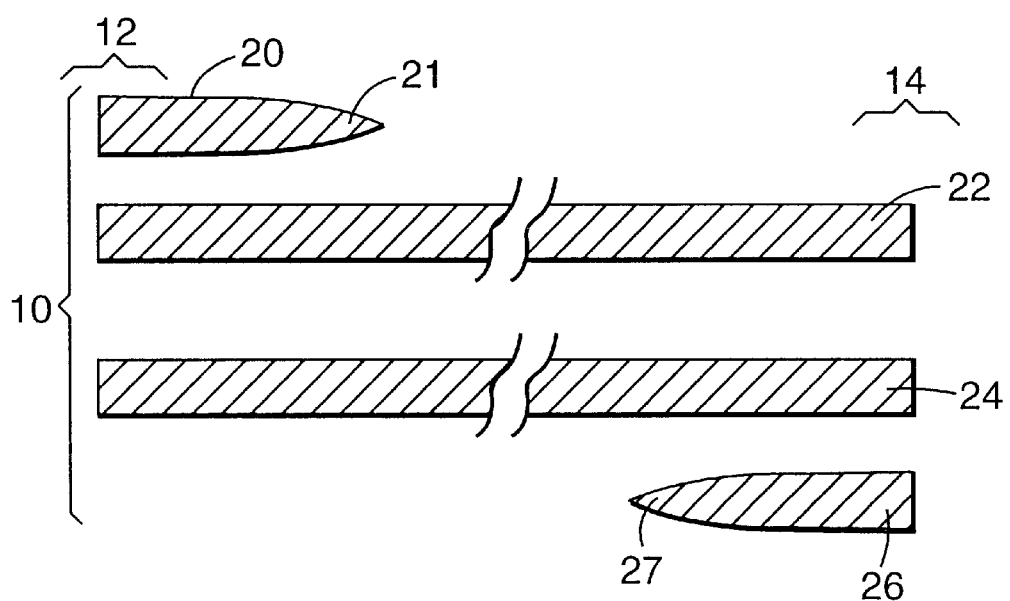
FIG. 2 is an exploded, enlarged cross-sectional view of the multilayer meltblown fibrous web 10 of FIG. 1 taken along line 2—2.

FIG. 2 illustrates various layers in the multilayer meltblown fibrous web 10. The relative dimensions and features depicted in FIG. 2 are exaggerated for the purposes of illustration. The web 10 preferably includes a plurality of interconnected layers of meltblown fibers, with each layer being deposited sequentially as will be described in more detail below.

The layers included in the web 10 are a first layer 20, intermediate layers 22 and 24, and a second layer 26. Both the first layer 20 and the second layer 26 include feathered edges 21 and 27, respectively. The feathered edges 21 and 27 are the result of the meltblown fiber deposition process in which the basis weight is gradually reduced to zero at the edges of the layer of meltblown fibers provided by the meltblown fiber source.

In known flat web meltblown fiber processes, the feathered edges would be located at the outer side edges of the formed web, where they typically would be trimmed from the web and discarded as waste material. In the present invention, however, the feathered edges 21 and 27 are incorporated into the multilayer meltblown fibrous web 10 in a manner that produces a web 10 having two separated edges 12 and 14, at least one feathered edge located between the two separated edges 12 and 14 and parallel to those edges 12 and 14, and at least one pair of interconnected layers of meltblown fibers.

In a preferred multilayer meltblown fibrous web, each layer is preferably interconnected by fiber entanglement to at least the immediately adjacent layer. In the illustrated web 10, the meltblown fibers of the first layer 20 are preferably entangled with the meltblown fibers of the intermediate layer 22, which are, in turn, entangled with the meltblown fibers of the intermediate layer 24, which are entangled with the meltblown fibers in the second layer 26. In addition, the layers that are not immediately adjacent to each other may also be interconnected depending on the layer thickness, the fibers being deposited, and the process used to deposit the fibers. For example, the meltblown fibers in the first layer 20 could be entangled with the meltblown fibers in both intermediate layer 22 as well as intermediate layer 24 in some instances if, for example, each layer was thin enough to allow such entanglement to occur.

A preferred mechanism by which the layers of the multilayer meltblown fibrous web 10 are interconnected is preferably by the same manner in which the individual layers are formed. In other words, the process involves directing a source of meltblown fibers towards at least one already-formed layer or layers of meltblown fibers. The meltblown fibers of the different layers 20, 22, 24 and 26 of the multilayer meltblown fibrous web 10 preferably become entangled by the same process used to entangle the individual fibers forming each layer together. As a result, there is typically no need for any additional material or processing required to connect the various layers together to form a finished multilayer meltblown fibrous web 10. For example, no additional adhesive, resin, etc. or any processing, such as pin welding, may be required to secure the various layers 20, 22, 24 and 26 together.

In some instances, additional agents or processing steps may sometimes be used to desirably assist in the interconnection of the layers of meltblown fibers together to form the finished web 10. For example, a resin, adhesive or other agents may be introduced in each layer or between adjacent layers to assist layer interconnection.

The cross-sectional view taken in FIG. 2 is taken in the direction of the section line 2—2 across the web 10 (along the edges 12 and 14) and, as a result, the direction of the cross-section seen in FIG. 2 is also generally in the machine direction. When viewed along the machine direction, the cross-sectional view of the multilayer meltblown fibrous web 10 in FIG. 2 illustrates another feature of the present invention, namely, the spatial relationship of feathered edges 21 and 27 to the separated edges 12 and 14. In the multilayer meltblown fibrous web 10, the feathered edges 21 and 27 are parallel to the separated edges 12 and 14 of the meltblown fibrous web 10 (see also FIG. 1). This is in direct contrast to other tubular formed webs that are longitudinally slit to form a flat meltblown fibrous web. In those webs, the feathered edges that are formed during manufacture of the tubular webs extend at an angle across the web, thereby forming a bias angle with respect to the centerline of the flat web. This is a result of slitting the tubular web longitudinally. In the present invention, however, the tubular multilayer meltblown fibrous web is slit helically and the resulting flat multilayer meltblown fibrous web 10 incorporates feathered edges that extend parallel to the separated edges 12 and 14.

Another feature of the meltblown fibrous webs 10 is the multilayer construction of the finished web 10. Although only two intermediate layers 22 and 24 are depicted in FIG. 2, each of these intermediate layers 22, 24 could be themselves formed of a plurality of separate layers such that the multilayer meltblown fibrous web 10 could be formed of 3, 4, 5, 6, 7 or more sequentially-formed layers of meltblown fibers including first and second layers and at least one intermediate layer. By providing a multilayer meltblown fibrous web 10, percentage variations in the density or basis weight as a result of the feathered edges 21 and 27 is significantly reduced.

For two webs having the same overall basis weight, a greater number of layers may advantageously be used because increasing the number of layers typically reduces cross-web variations in the web basis weight. In such a construction, the basis weight of each individual layer is generally reduced to compensate for the increased number of layers. For example, the multilayer meltblown fibrous web 10 preferably includes at least one intermediate layer between the first and second layers 20 and 26. More preferably, the multilayer meltblown fibrous web 10 includes about four or more intermediate layers between first and second layers 20 and 26. These preferences, however, vary based on the intended use of the multilayer meltblown fibrous web 10 and a variety of other factors such as desired total basis weight, minimum basis weight of each layer, etc.

Returning to FIG. 1, a portion of the multilayer meltblown fibrous web 10 can be die cut, stamped, or otherwise separated from the web 10 to provide a multilayer meltblown fibrous article 18. Such articles 18 can exhibit characteristics unique to multilayer meltblown fibrous articles 18 manufactured from a multilayer meltblown fibrous web 10. Among those characteristics is that the article 18 includes a plurality of layers as described above. In addition, regardless of the shape of the multilayer meltblown fibrous article 18, the meltblown fibers in each of the layers typically exhibit a detectable machine direction indicative of the helical movement of the collector on which the web 10 was formed. Furthermore, the machine directions exhibited by the meltblown fibers in each of the layers in the multilayer meltblown fibrous article 18 typically are parallel to each other because the layers are formed on the same collector.

The machine direction of the collector on which a meltblown fibrous web 10 is formed can be determined, in one method, based on the tensile strength of the web. The tensile strength of the web 10 is generally higher in the cross-web direction than in the downweb direction (corresponding to the centerline of the web as described above). As a result, any feathered edges in multilayer meltblown articles 18 will be oriented generally transverse to the axis of maximum tensile strength.

The machine direction can also be determined based on the shapes of fiber ropes or bundles in the meltblown fiber layers. When meltblown fibrous webs are formed, it is normal for some fibers to stick together and form fiber bundles or ropes. The fiber bundles are normally laid down in the web in the shape of an arc with the apex of the arc pointing in the downweb direction. Examination of a meltblown fibrous web 10 or article 18 on, for example, a light table should reveal the orientation of the fiber bundles.

Depending on which portion of the web 10 the multilayer meltblown fibrous articles 18 are taken from, the multilayer meltblown fibrous articles 18 may also include one or more of the feathered edges 21 and 27 incorporated into the web 10 as described above. Those feathered edges 21 and 27 would generally be visible as being parallel to the machine directions defined by the meltblown fibers in each of the layers making up the multilayer meltblown fibrous articles 18.

Figure 3:
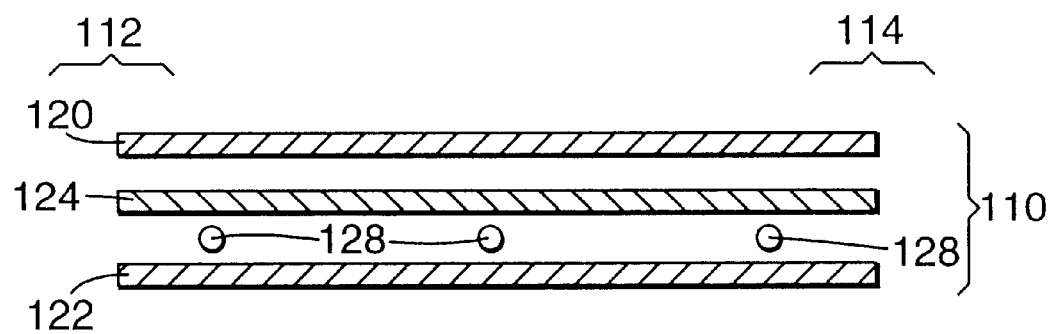
FIG. 3 is an exploded, enlarged cross-sectional view of an alternate multilayer meltblown fibrous web 110 according to the present invention.

FIG. 3 depicts a cross-sectional view of another multilayer meltblown fibrous web 110. As with FIG. 2, this figure is also a schematic diagram in which the various proportions have been exaggerated for illustrative purposes. The web 110 includes a first portion 120 of meltblown fibers and a second portion 122 of meltblown fibers. The first and second portions 120 and 122 each preferably include a feathered edge of meltblown fibers on the outermost layers in those portions of the multilayer meltblown fibrous web 110 as described above with respect to multilayer meltblown fibrous web 10. Those feathered edges preferably extend parallel to the separated edges 112 and 114 of the multilayer meltblown fibrous web 110 as also discussed above with respect to multilayer meltblown fibrous web 10. Each of the first and second portions 120 and 122 can include one or more sequentially applied layers of meltblown fibers.

Located between the first and second meltblown fibrous web portions is an intermediate portion 124 of the multilayer meltblown fibrous web 110. The intermediate portion 124 may also include one or more materials other than the meltblown fibers. The other materials could be in the nature of films, particulates, fibers, liquids, and combinations thereof. For example, intermediate portion 124 may include activated carbon to assist in removing gaseous and/or vaporous contaminants (see, for example, U.S. Pat. No. 3,971,373 to Braun). In another variation, the intermediate portion 124 could include a membrane having desired properties such as limited permeability, etc. The intermediate portion 124 of multilayer meltblown fibrous web 110 could comprise or consist essentially of these other materials, or the intermediate portion 124 may include those additional materials/layers in addition to one or more meltblown fibers layers.

The web 110 may also incorporate one or more elements such as a fiber or thread 128 that extends generally parallel to the separated edges 112 and 114 of the web 110. Examples of suitable elements 128 include monofilament lines, woven threads, straps, etc. The additional elements 128 may be provided to improve the strength of the web 110 or provide a line along which the web 110 can be torn, folded, etc.

If the materials other than meltblown fibers in intermediate portion 124 and/or the elements 128 do not inherently interconnect to or bond with the meltblown fibers in the remainder of the multilayer meltblown fibrous web 110, it may be desirable to provide one or more agents or perform other process steps (such as welding) to assist in bonding the meltblown fibers to those materials. For example, it may be desirable to provide adhesives, resins, etc. to assist in sufficient attachment of the meltblown fiber layers 120 and 122 to the materials other than meltblown fibers in the intermediate portion 124 and/or elements 128. Alternatively or in addition to those agents, the intermediate portion 124 of the multilayer meltblown fibrous web 110 may include at least some meltblown fibers to assist in capturing, bonding, or entangling the various materials other than meltblown fibers in the multilayer meltblown fibrous web 110.

The inventive multilayer meltblown fibrous articles, such as article 18 illustrated in FIG. 1 above, can be incorporated into a variety of different products in which the properties of the inventive articles can be exploited. One type of product into which the multilayer meltblown fibrous articles may be incorporated is a mask worn over a person's breathing passages to prevent contaminants from entering the wearer's respiratory tract and/or protect other persons or things from exposure to pathogens or other contaminants expelled by the wearer during respiration. As used in connection with the present invention, the term "mask" means a device adapted to serve either of these purposes and includes respirators and filtering face masks.

Figure 4:
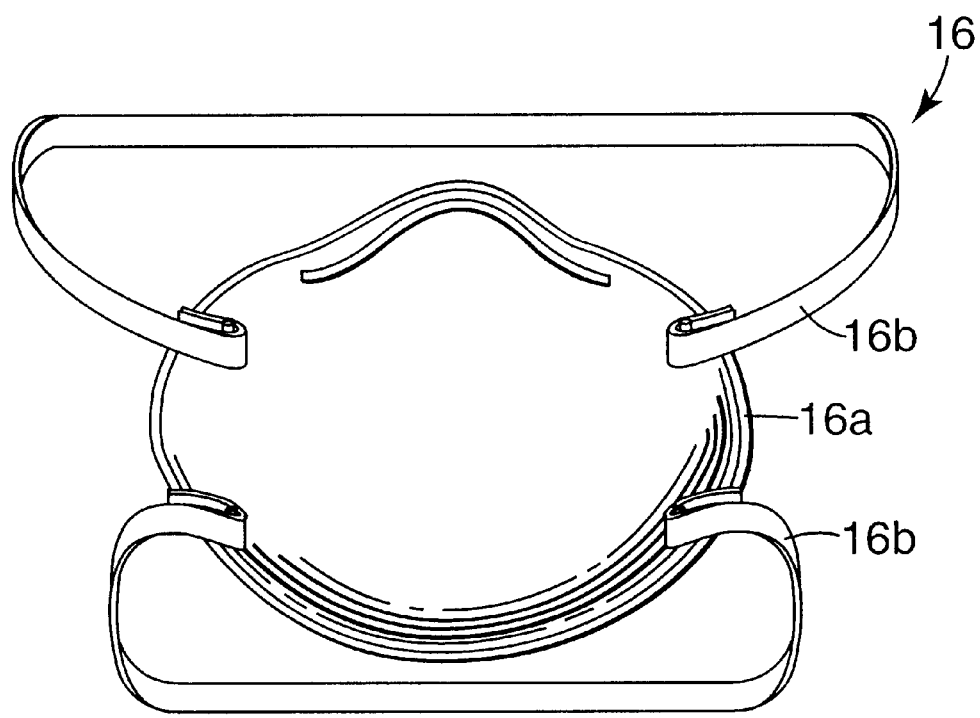
FIG. 4 depicts a respirator mask 16 including multilayer meltblown fibrous web as a filter in accordance with the present invention.

FIG. 4 depicts one embodiment of a mask 16 that includes a porous mask body 17 and retaining straps 19. The mask body 17 may include a multilayer meltblown fibrous article of this invention as a filter media for filtering particulates. The mask body typically includes a support structure such as a shaping layer that supports the filter media. In other respirators, a substantial portion of the mask body may be constructed of a material that is substantially impermeable to air (see, for example, U.S. Pat. No. 5,062,421 to Burns et al. which describes an elastomeric rubber face piece or U.S. Pat. No. Re 35,062 to Brostrom et al.). In these masks, the inventive multilayer meltblown articles may be used as a particulate filter that is supported in the filter cartridges. Masks having the cup-shaped configuration shown in FIG. 4 are described in, for example, U.S. Pat. No. 5,307,796 to Kronzer et al., U.S. Pat. No. 4,807,619 to Dyrud et al. and U.S. Pat. No. 4,536,440 to Berg. Masks of the invention may take on other configurations, such as flat masks, alternative cup-shaped masks, and masks that include filtration assemblies. See, for example, U.S. Pat. No. Re 28,102 (Mayhew); U.S. Pat. No. 3,971,373 (Braun); U.S. Pat. No. 4,215,682 (Kubik et al.); U.S. Pat. No. 4,419,993 (Peterson); U.S. Pat. No. 4,547,420 (Krueger et al.); U.S. Pat. No. 4,729,371 (Krueger et al.); U.S. Pat. No. 4,795,668 (Krueger et al.); and U.S. Pat. No. 4,827,924 (Japtunich).

Figure 5:
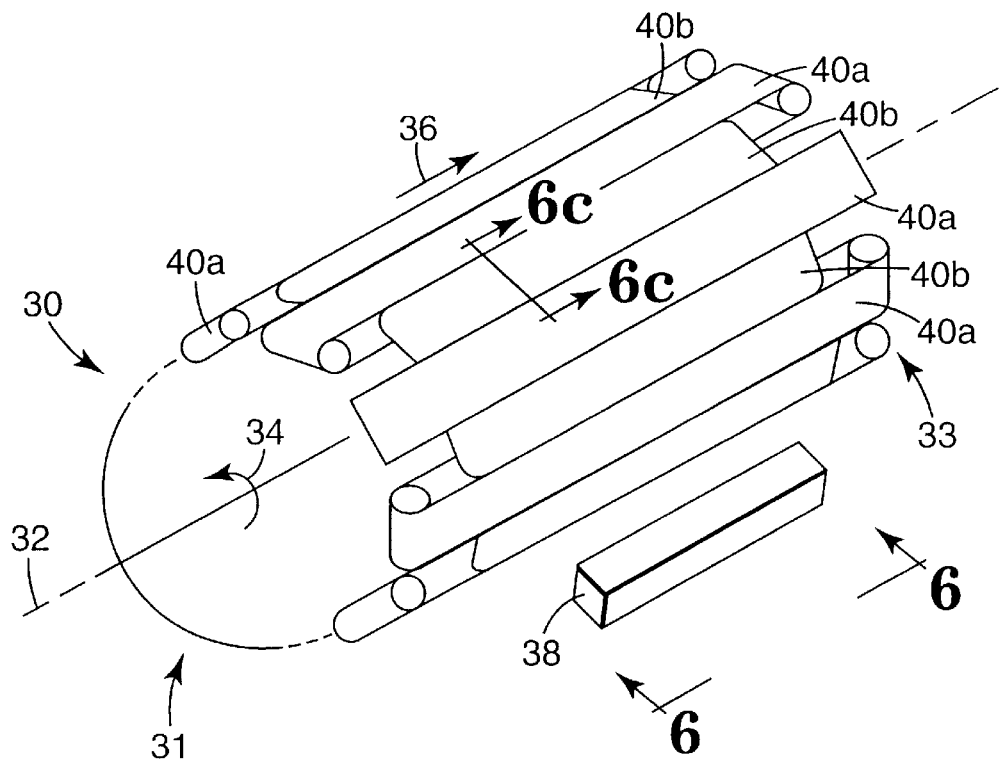
FIG. 5 is a perspective view of one apparatus that includes a collector 30 useful in manufacturing a multilayer meltblown fibrous web in accordance with the present invention.

FIG. 5 illustrates a portion of an apparatus for forming a multilayer meltblown fibrous webs. The portion of the apparatus illustrated in FIG. 5 includes a collector 30 that provides a generally cylindrical forming surface rotating about longitudinal axis 32 in the direction 34. In addition to rotating about the longitudinal axis 32, the forming surface of the collector 30 also preferably moves longitudinally along the length of the longitudinal axis 32 in the direction of arrow 36. As a result, any selected point on the forming surface of collector 30 moves in a generally helical pattern about and along the longitudinal axis 32 from a first collector end 42 to a second collector end 44.

The illustrated apparatus also includes a source 38 of meltblown fibers that is directed at the forming surface of collector 30. The source 38 preferably extends along at least a portion of the longitudinal length of the collector 30 with one end of the source 38 being located near the first collector end 31 and the opposite end of the source 38 being located farther down the length of the collector 30 nearer to the second collector end 33.

The preferred source 38 of meltblown fibers is a die, although essentially any other source of meltblown fibers is contemplated including, but not limited to, capillaries, spinerettes, etc. A preferred die directs meltblown fibers at the forming surface of the collector 30 along a generally straight line that is generally parallel to the longitudinal axis 32.

The fibers can be directed onto the collector 30 using known techniques such as those described by Wente, Van A., "Superfine Thermoplastic Fibers," Industrial Engineering and Chemistry, Vol. 48, pp. 1342–1346 (1956), Report No. 4364 of the Naval Research Laboratories, published May 25, 1954, entitled *Manufacture of Superfine Organic Fibers*, by Wente, V. A.; Boone, C. D.; and Fluharty, E. L., and U.S. Pat. No. 3,971,373 (Braun). Generally, the fibers are directed to the collector 30 by a high velocity gaseous stream (typically air) that attenuates the extruded material into fibers.

One preferred collector 30 includes a forming surface that includes a plurality of rotating belts. The belts rotate such that the webs formed on the collector 30 move towards the second collector end 33.

Figure 6:
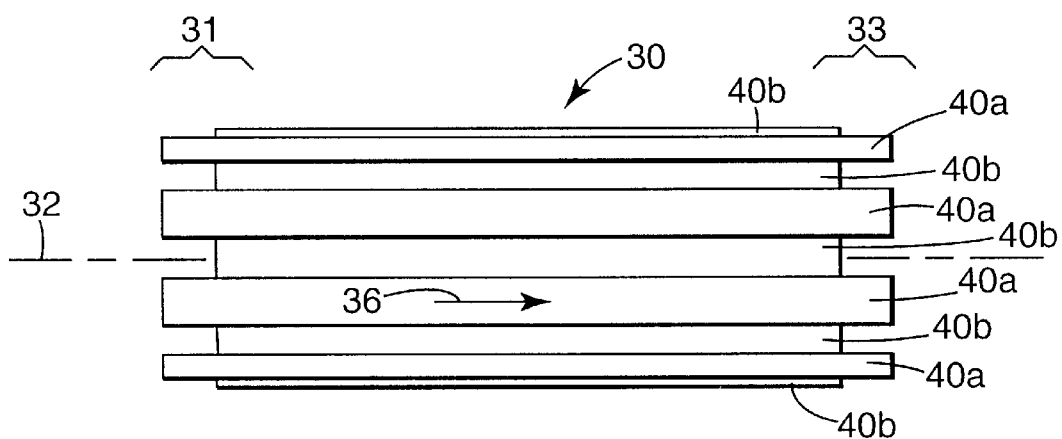
FIG. 6 is a view of one preferred forming surface used in a collector 30 for the apparatus of FIG. 5, taken along line 6—6 in FIG. 5.

FIG. 6 depicts one view of the collector 30 of FIG. 5 from the direction of line 6—6 in FIG. 5. The forming surface of the collector 30 includes a number of rotating belts 40*a* and 40*b*, all of which are rotating in the direction indicated by arrow 36 on the exterior of the collector 30. In other words, the belts 40*a* and 40*b* are rotating from a first collector end 31 to a second collector end 33.

Figure 6A:
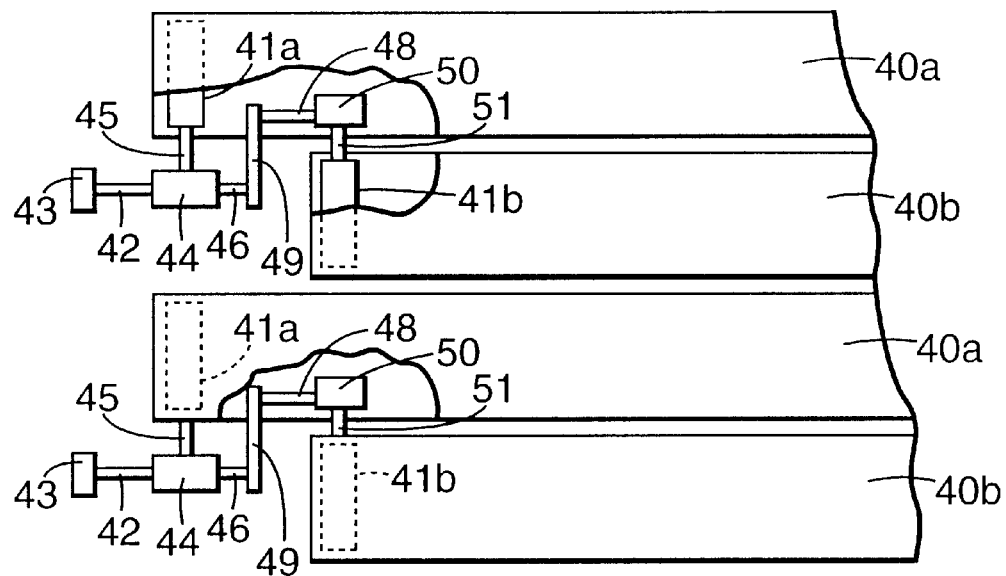
FIG. 6A is an enlarged partial cross-sectional view illustrating the power transfer system used to rotate the belts 40a and 40b in the apparatus of FIGS. 5 and 6.

As shown in FIG. 6A, the forming surface of the collector 30 is composed of a series of alternating long belts 40*a* and short belts 40*b* to allow room for the power transfer components needed to transfer power to the drive rolls 41*a* and 41*b* supporting the ends of the long belts 40*a* and 40*b*, respectively. The belts 40*a* and 40*b* are depicted in an adjacent planar relationship, in other words, as if the cylinder has been unrolled, in order to better illustrate the power transfer components.

As seen there, each power input shaft 42 includes an outer drive sprocket 43 and is used to supply power to a first right angle gearbox 44 that includes an output shaft 45 supplying power to a drive roll 41*a*. The gearbox 44 also includes a second output shaft 46 supplying power to a timing belt 49 which transfers power to a transfer shaft 48. The transfer shaft 48 supplies power to a second right angle gearbox 50 that includes an output shaft 51 rotating the drive roll 41*b* that drives the short belt 40*b*. As a result, each of the power input shafts 42 drives one of the long belts 40*a* and an adjacent short belt 40*b* in the preferred collector apparatus 30.

Figure 6C:
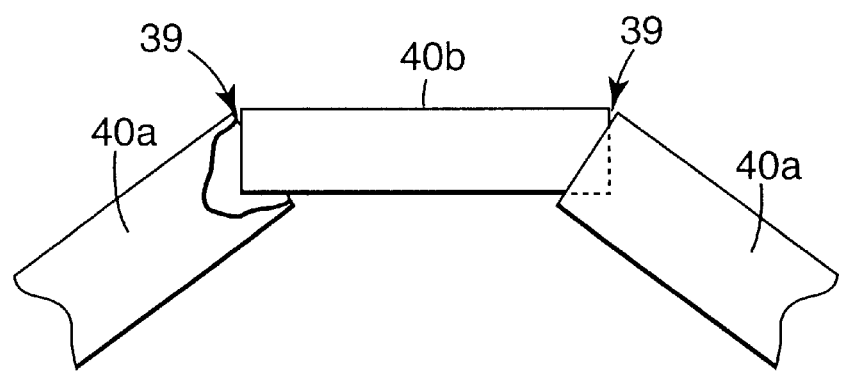
FIG. 6C is an enlarged partial cross-sectional view of the nested belts 40a and 40b in the collector 30 of FIG. 5, taken along line 6C—6C.
Figure 6B:
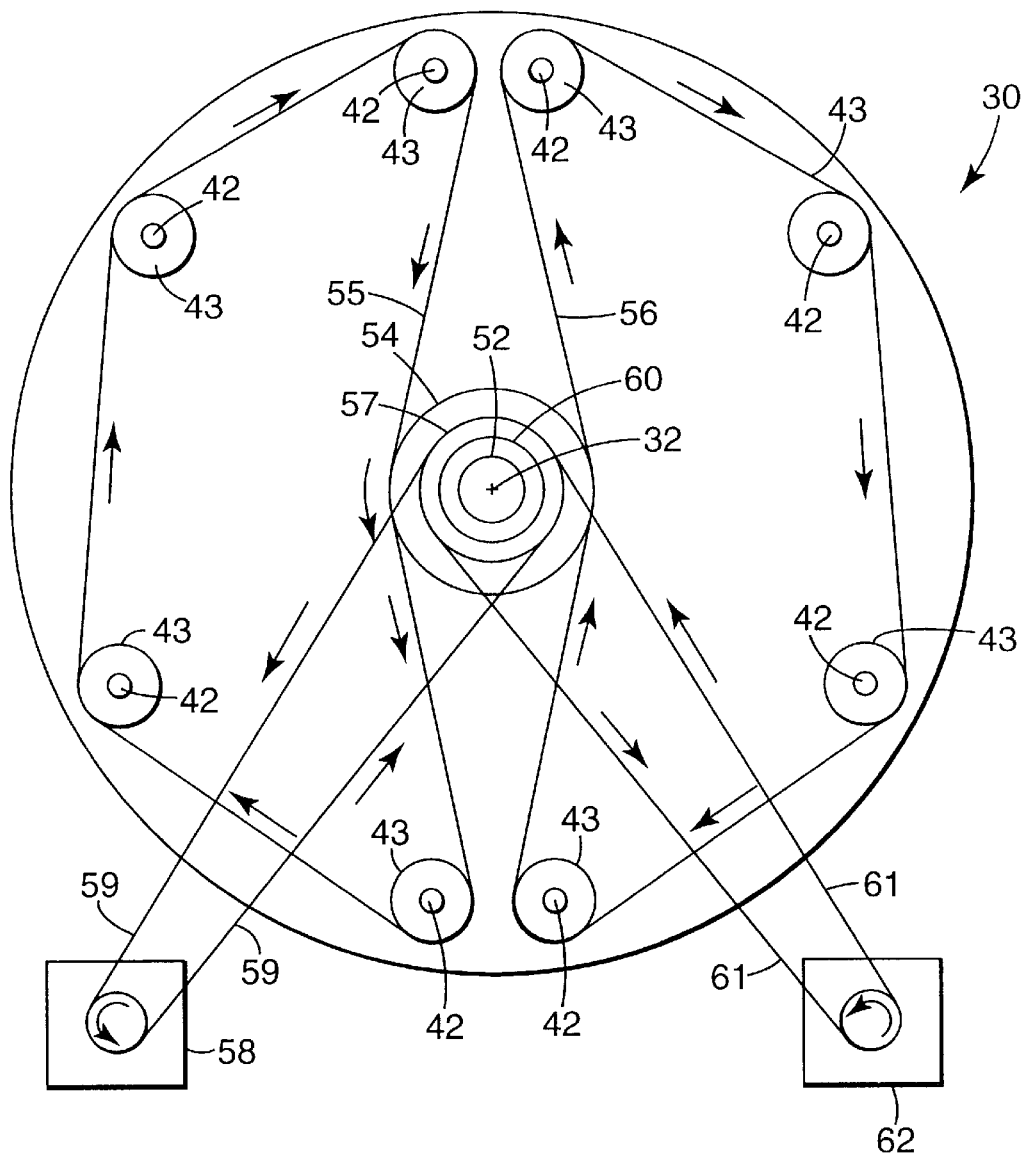
FIG. 6B is a schematic end view of the power transfer system used to supply power to the shafts 42 that rotate the belts 40a and 40b along the longitudinal axis 32 and rotate the entire collector 30 about the longitudinal axis 32.

The components used to transfer power to the power input shafts 42 and corresponding sprockets 43 are illustrated in FIG. 6B where an end view depicts the arrangement of the power input shafts 42 and drive sprockets 43 in the collector 30. The drive sprockets 43 are arranged about the longitudinal axis 32 of the collector 30 as seen in FIG. 6B. Belt drive sprocket 54 rotates about the longitudinal axis 32 and transfers power to the individual drive sprockets 43 via two chains 55 and 56 that rotate with the rotation of the belt drive sprocket 54. The belt drive sprocket 54 is preferably operatively attached to a drive sprocket 57 that is driven by a belt drive motor 58 using a separate chain 59. As the motor 58 drives the chain 59, the drive sprocket 57 rotates, which, in turn, rotates the belt drive sprocket 54. The belt drive sprocket 54 drives the chains 55 and 56 which drive the power input shafts 42 via drive sprockets 43.

The collection of belts 40*a* and 40*b* forming the cylindrical collector 30 rotate about the longitudinal axis 32 using the main drive sprocket 60, which receives power from main drive motor 62 via drive chain 61. The main drive sprocket 60 is operatively attached to the central shaft 52, the center of which is coextensive with the longitudinal axis 32. The belt drive sprocket 54 and drive sprocket 57 preferably mount to the central shaft 52, but rotate independently of it by the use of bearings located between the central shaft 52 and belt drive sprocket 54/drive sprocket 57.

Because the collector 30 includes separate drive systems for driving the belts 40*a* and 40*b* along the longitudinal axis 32 and simultaneously rotating the collector 30 about the longitudinal axis 32, the helix angle of the helix formed by the movement of a selected point on the forming surface of the collector 30 can be controlled. Alternatively, a single drive system could be used to power both the rotation of the belts 40*a* and 40*b* and the rotation of the collector 30 about the longitudinal axis 32, with changes between the relative rates of motion being made by gear ratio adjustments. The use of two separate drive systems does, however, provide the ability to quickly change that relationship without machine downtime.

The belts 40*a* and 40*b* are preferably arranged with a relatively small gap between their adjacent edges such that, as meltblown fibers are directed at the forming surface of the collector 30 from the source 38, they are capable of forming a self-supporting layer of meltblown fibers. The maximum gap between the edges of adjacent belts 40*a* and 40*b* is preferably about 3 millimeters or less. Larger gaps may also be possible depending on the materials making up the meltblown fibers, the sizes of the meltblown fibers, the rate of deposition on the forming surface, the distance between the source of meltblown fibers and the forming surface, the temperature of the forming surface, etc.

To achieve that small gap between adjacent belts 40*a* and 40*b*, the belts are preferably nested within each other. As seen in FIG. 6C, a partial enlarged cross-sectional view of the collector 30 taken along line 6C—6C in FIG. 5, the short belts 40*b* are located partially within the long belts 40*a* on the interior of the cylinder formed by the belts.

The number of layers in the multilayer meltblown fibrous web is, in the apparatus including only one source 38 of meltblown fibers, a function of the relative rate of rotation of the collector 30 about axis 32, the rate of translational movement of the forming surface of the collector 30 in direction 36, and the distance along axis 32 over which the source 38 deposits meltblown fibers on the forming surface of the collector 30. For example, if a multilayer meltblown fibrous web having approximately six layers of meltblown fibers is desired, then the relative rate of rotation of the collector 30 about axis 32 as compared to the rate of translation 36 will preferably be such that any particular point on the surface of the collector 30 passes between source 38 and the forming surface of the collector 30 approximately six times during its helical movement about and along collector 30. Changing any one or more of the above-listed factors may have an impact on the number of layers of meltblown fibers provided in any multilayer meltblown fibrous web produced using the apparatus and methods of the present invention.

Figure 7:
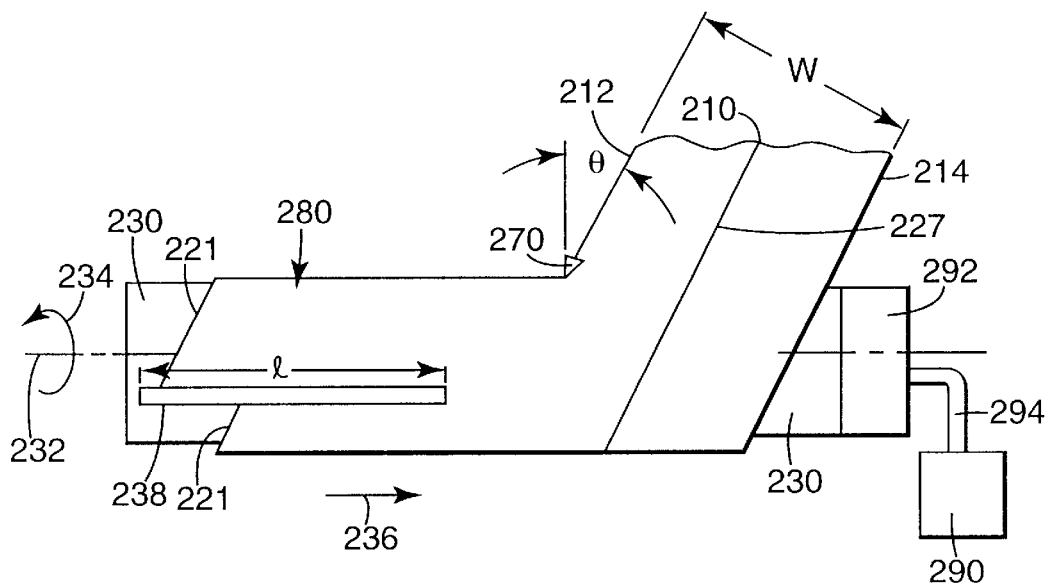
FIG. 7 is a schematic diagram of a tubular multilayer meltblown fibrous web 280 according to the present invention and an apparatus 230 for forming such a web according to the invention.

FIG. 7 schematically illustrates one tubular multilayer meltblown fibrous web 280 and the cylindrical collector 230 onto which the web is formed. FIG. 7 shows a source 238 of meltblown fibers and a separator 270 in addition to the tubular web 280. The tubular web 280 is preferably formed on a collector 230 similar to collector 30 described above. The tubular web 280 is advanced along the longitudinal axis 232 in a direction 236 while simultaneously rotating about the axis 232 during formation on the collector. The simultaneous rotational and longitudinal movement of the collector 230 beneath the source 238 of meltblown fibers forms the feathered edges 221 and 227 as seen in FIG. 7 on the tubular meltblown fibrous web 280. The helical nature of the first feathered edge 221, is illustrated in FIG. 7 where, above the source 238, the first feathered edge 221 extends from the outer-most or left-most portion of the source 238 while, after rotating about the collector, the same first feathered edge 221 is located at some distance across the length of the source 238 (along axis 232). Similarly, at the right-most or opposite end of the source 238 of meltblown fibers, the second feathered edge 227 associated with the flat multilayer meltblown fibrous web 210 is seen extending away from the source 238 towards the top of the tubular web 280.

FIG. 7 also depicts a separator 270 that separates the tubular meltblown fibrous web 280 into a flat or planar web 210 having two separated edges 212 and 214. Angle θ, the angle at which the separator 270 operates on the tubular meltblown fibrous web 280 is substantially equal to the helix angle provided by the relationship between the rotation of collector 230 and resulting tubular web 280 about longitudinal axis 232 in combination with the translational motion 236 along the longitudinal axis 232. That helix angle is also the angle followed by the feathered edges 221 and 227 with axis 232.

Although the separator 270 is illustrated as being near an end of the collector 230 in FIG. 7, the separator 270 may be located remote from the collector 230 in accordance with the present invention. Even when located remote from the collector 230, however, the separator 270 preferably separates the tubular multilayer meltblown fibrous web 280 along a direction generally parallel to the helix angle as discussed above.

As a result, the flat multilayer meltblown fibrous web 210 will have a generally constant width between the separated edges 212 and 214. In addition, the multilayer meltblown fibrous web 210 also incorporates the feathered edges produced by the source 238 that would otherwise be trimmed from the web and discarded. The second feathered edge 227 is seen in the view of FIG. 7 and the first feathered edge is located on the opposite surface of the multilayer meltblown fibrous web 210.

After the separating operation performed by separator 270, the flat multilayer meltblown fibrous web 210 can be either wound into a roll for use in other processes or the web 210 can be transferred directly into a manufacturing process in which the multilayer meltblown fibrous web 210 is used. Because the web 210 has two separated edges 212 and 214, there is no need to further trim the edges or deal with waste material as discussed above, thereby facilitating its use in such in-line manufacturing processes.

The separator 270 could be provided in many different forms, and essentially any device that is capable of separating the web is contemplated by this invention. Examples of suitable separators 270 in the form of slitters include, but are not limited to: knives, lasers, water jets, ultrasonic horns, hot wires, flames, etc. Other contemplated separators may include rotary dies, lasers, water or fluid jet streams, and other devices or operations designed to separate a tubular multilayer meltblown fibrous web along a helical path.

FIG. 7 also shows a vacuum source 290 connected to a manifold 292 located at one end of the collector 230. The manifold 292 is connected to the vacuum source 290 by line 294. Manifold 292 is preferably located at one end of the generally cylindrical forming surface of the collector 230. The web 280 preferably is formed on the collector 230 under slightly negative air pressure provided by the vacuum source 290 to assist in removing air and other gasses typically used in directing the meltblown fibers towards the forming surface of the collector 230. The forming surface preferably is permeable and, as a result, a negative pressure condition within the volume defined by the forming surface can be communicated through the forming surface.

The flat multilayer meltblown fibrous web 210 produced on the collector 230 includes multiple layers of meltblown fibers in which the feathered edges 221 and 227 are incorporated into the web 210 between the separated edges 212 and 214. The exact location of the feathered edges 221 and 227 is, however, variable based on a number of factors.

Figure 8A:
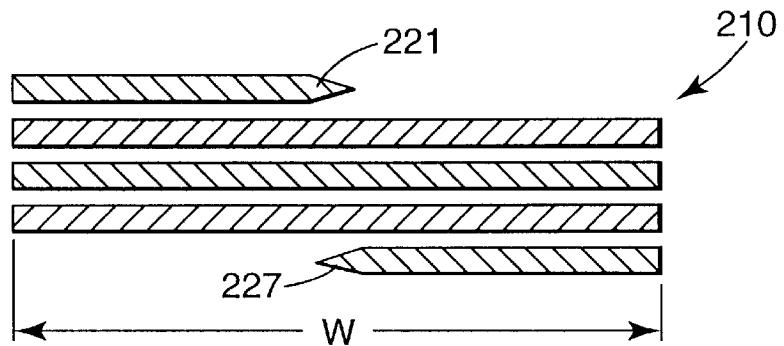
FIGS. 8A–8C are exploded, enlarged cross-sectional views of an alternate multilayer meltblown fibrous webs 210, 210', and 210" in accordance with the present invention.
Figure 8B:
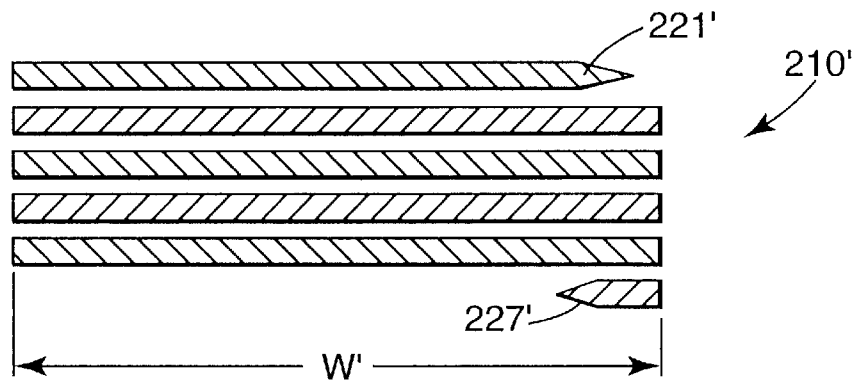
Figure 8C:
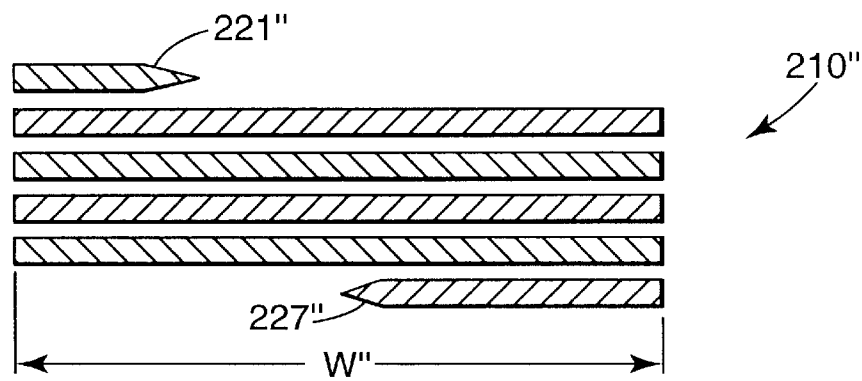

FIGS. 8A–8C illustrate a variety of relationships possible within the flat multilayer meltblown fibrous webs 210 formed by operation of the collector apparatus 230. The width of each layer formed by the source of the meltblown fibers 238 (as measured along the longitudinal axis 232) should be at least as long as the distance over which a point on the forming surface travels in one complete revolution of the forming surface. That distance, in other words, the distance over which a point on the forming surface travels in one complete revolution of the forming surface, is sometimes referred to as the precession rate. If the width of each meltblown fiber layer is less than the precession rate, then gaps will be produced between the layers in the longitudinal direction. For simplicity in the following discussion, the width of the meltblown fiber layers will be assumed to be equal to the length of the meltblown fiber source 238. The actual width of the meltblown fiber layers on the forming surface can, however, vary from the length of the meltblown fiber source 238 by various manufacturing techniques involving airflow direction, etc.

The spatial relationships between the feathered edges and the location of the feathered edges between the separated edges can vary based on the relationship between the length of the meltblown fiber source 238 along the longitudinal axis 232 as compared to the maximum width w of the flat multilayer meltblown fibrous web 210 between the separated edges, where the maximum width of the web 210 is determined by the precession rate of the collector. The maximum width of the web 210 is referred to with the understanding that the web 210 could be separated into two or more narrower webs, provided that the cumulative width of the narrower webs could not exceed the maximum width w which is a function of the precession rate under steady state operating conditions.

The web 210 illustrated in FIG. 8A includes feathered edges 221 and 227 located directly above each other through the thickness of the web 210. In this arrangement, the ratio of the longitudinal length l (see FIG. 7) of the source 238 (FIG. 7) to the width w of the web 210 is an integer relationship, in other words, l:w is about 1:1, 2:1, 3:1, etc.

FIG. 8B illustrates that alignment of the feathered edges 221' and 227' can occur at any point across the width of the web 210' and is determined only by the original location of the separator 270 at which separation of the tubular web 280 is performed. The web 210' is also formed by a system in which the ratio of the longitudinal length of the meltblown fiber source to the width w' of the web 210' is an integer relationship, in other words, 1:1, 2:1, 3:1, etc.

Where the longitudinal length of the source of meltblown fibers is less than the separated web width, a different relationship between the feathered edges is obtained. As seen in FIG. 8C, the multilayer meltblown fibrous web 210" includes feathered edges 221" and 227" that are separated across the width of the web 210". To obtain the web 210" with separated feathered edges 221"/227" the width w" of the web is less than the longitudinal length of the meltblown fiber source. The feathered edges 221"/227" are not vertically aligned through the thickness of the web 210" because the ratio of the longitudinal length of the meltblown fiber source 238 (FIG. 7) to the width w" of the web 210" is not an integer relationship. In other words, that ratio is, for example, 1.6:1; 2.2:1, 3.1:1; etc.

Although the various apparatus and methods have been depicted with, for example, the use of one meltblown fiber source, the present invention could also be practiced with more than one meltblown fiber source. In addition, various other materials could be incorporated into the multilayer meltblown fibrous webs of the present invention by the addition of other sources of other materials.

Figure 9:
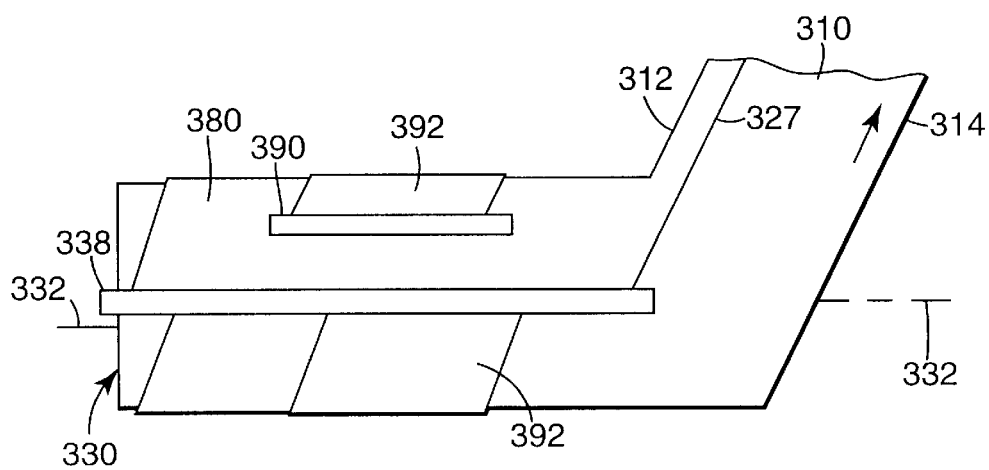
FIG. 9 is a schematic diagram of an alternate tubular multilayer meltblown fibrous web 380 in accordance with the present invention.

Once such variation is depicted in FIG. 9 in which a meltblown fiber source 338 is used to deposit meltblown fibers on a rotating traversing collector 330. A secondary source 390 is also shown as depositing a different layer 392 on a portion of the forming surface of the collector 330. Because a portion of the tubular multilayer meltblown fibrous web 380 has already been deposited on the collector surface 330, the additional material or materials 392 provided by secondary source 390 are preferably located on top of at least one layer of meltblown fibers. In addition, because the secondary source 390 terminates short of the right end of the primary source 338 of meltblown fibers, an outer layer of meltblown fibers is deposited on top of the layer 392 as it passes underneath the source 338 of meltblown fibers at least one more time before reaching separator 370 where the tubular web 380 is separated along the helix angle to form a flat multilayer meltblown fibrous web 310 having separated edges 312 and 314.

The apparatus and process depicted in FIG. 9 would be useful for producing webs similar to the web 110 depicted in FIG. 3. In that situation, the material or materials provided by the secondary source 390 could be other than the meltblown fibers provided by the primary source 338. For example, the secondary source could deposit activated carbon, materials needed to form a membrane within the tubular web 380, etc. Alternatively, the secondary source 390 could also provide only meltblown fibers to assist in providing multilayer meltblown fibrous webs having increased numbers of layers in collectors having shorter longitudinal lengths. Other variations that may be introduced into multilayer meltblown fibrous webs manufactured using one or more sources of meltblown fibers include variations in color of the webs, variations in fiber composition, variations in the fiber size and/or distribution throughout the thickness of the web, and others.

Figure 10:
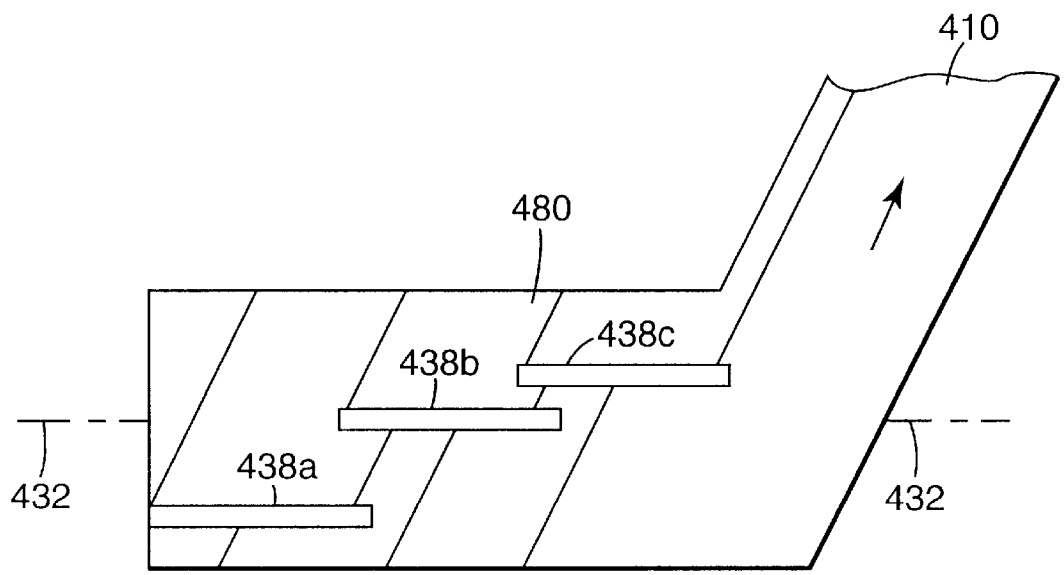
FIG. 10 is a schematic diagram of another tubular multilayer meltblown fibrous web 480 in accordance with the present invention.

One approach to providing a graded density multilayer meltblown fibrous web 410 is illustrated in FIG. 10 in which a collector 430 is used in connection with three sources of meltblown fibers 438a, 438b and 438c (collectively referred to as sources 438). Each of the sources 438 is directed at a different portion of the collector 430 and forms a different layer of meltblown fibers on the tubular multilayer meltblown fibrous web 480. Although all the sources 438 could provide meltblown fibers having the same properties, it may be advantageous for each of the sources 438 to provide meltblown fibers having different properties. In that situation, the layers formed by each of the sources 438 could have different densities, different fiber compositions, or other properties. Where each layer of meltblown fibers has a different density from the adjacent layers, the apparatus 430 could be used to manufacture a graded density multilayer meltblown fibrous web 410 in which the feathered edge produced by each of the sources of meltblown fibers 438 is incorporated into the web 410 itself as discussed above.

Figure 11:
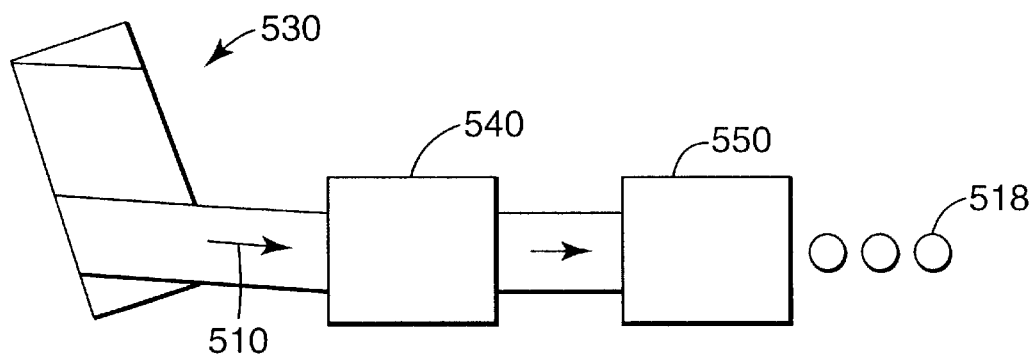
FIG. 11 is a schematic diagram of one in-line manufacturing process using a multilayer meltblown fibrous web 510 in accordance with the present invention.

The continuous nature of the processes of forming multilayer meltblown fibrous webs as described herein is advantageous when the webs are to be processed in-line. One such system is illustrated in FIG. 11 in which the collector 530 is used in combination with converting stations 540 and 550. The web 510 produced by the collector 530 is guided directly into the first converting station 540 where one or more converting operations are performed followed by converting station 550 where one or more additional converting operations are performed to produce multilayer meltblown fiber articles 518 such as masks or other articles in an in-line process.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated.

Various modifications and alterations of this invention will become apparent to those skilled in the art without departing from the scope of this invention, and it should be understood that this invention is not to be unduly limited to illustrative embodiments set forth herein.

What is claimed is:

1. An apparatus for manufacturing a meltblown fibrous web, the apparatus comprising:

(i) a collector comprising a generally cylindrical forming surface that can rotate about a longitudinal axis and that can simultaneously move parallel to the longitudinal axis such that a selected point on the forming surface can move in a helical pattern about and along the longitudinal axis from a first end of the collector to a second end of the collector, the helical pattern defining a helix angle relative to the longitudinal axis;

(ii) a source that is capable of directing meltblown fibers at the forming surface; and (iii) a separator that can separate a tubular meltblown fibrous web formed on the forming surface in a direction generally parallel to the helix angle to convert the tubular meltblown fibrous web into a non-tubular meltblown fibrous web.

2. The apparatus of claim 1, wherein the separator comprises a slitter.

3. The apparatus of claim 1, further comprising a first drive system that can rotate the forming surface of the collector about the longitudinal axis and a second drive system that can move the forming surface along the longitudinal axis, such that the rotational speed of the collector can be controlled independently of the longitudinal speed to vary the helix angle.

4. The apparatus of claim 1, wherein the source comprises a die that is capable of extruding microfibers.

5. The apparatus of claim 1, further comprising a secondary source that directs a second material at the forming surface of the collector.

6. The apparatus of claim 5, wherein the secondary source comprises a die capable of extruding meltblown polymeric material.

7. The apparatus of claim 1, wherein the forming surface of the collector comprises a plurality of belts that can move along the longitudinal axis of the collector.

8. The apparatus of claim 1, further comprising a vacuum source in fluid communication with the volume defined by the forming surface.

9. A method of manufacturing a meltblown fibrous web, which method comprises:

providing a collector that includes a generally cylindrical forming surface;

rotating the forming surface about a longitudinal axis and simultaneously moving the forming surface longitudinally in the direction of the longitudinal axis such that a selected point on the forming surface moves in a helical pattern about and along the longitudinal axis from a first end of the collector to a second end of the collector, the helical pattern defining a helix angle relative to the longitudinal axis;

directing meltblown fibers at the forming surface as the forming surface rotates and moves longitudinally, wherein a tubular meltblown fibrous web is formed on the forming surface; and separating the tubular meltblown fibrous web along a direction generally parallel to the helix angle to convert the tubular meltblown fibrous web into a non-tubular meltblown fibrous web.

10. The method of claim 9, wherein the selected point on the forming surface rotates around the longitudinal axis at least about two times in the time required for the selected point to move along the entire longitudinal length of the forming surface.

11. The method of claim 9, wherein the selected point on the forming surface rotates around the longitudinal axis at least about four times in the time required for the selected point to move along the entire longitudinal length of the forming surface.

12. The method of claim 9, further comprising forming a first feathered edge in the helical pattern on the interior of the tubular meltblown fibrous web and a second feathered edge in the helical pattern on the exterior surface of the tubular meltblown fibrous web.

13. The method of claim 12, wherein the second feathered edge is formed on at least one intermediate layer of meltblown fibers located between the first and second feathered edges.

14. The method of claim 9, wherein the separating comprises slitting.

15. The method of claim 9, further comprising directing a second material at the forming surface of the collector.

16. The method of claim 15, wherein the second material comprises meltblown fibers.

17. The method of claim 9, further comprising drawing a vacuum from within the volume defined by the forming surface.

18. The method of claim 9, wherein the meltblown fibers are microfibers.

19. The method of claim 18, further comprising imparting a persistent electric charge into the microfibers to product an electronically-charged web.

20. A method of making a filter, which comprises placing the electrically-charged web of claim 19 into a supporting structure.

21. A method of making a mask, which comprises:

the method of claim 20, wherein the supporting structure is a cup-shaped porous structure.

* * * * *

UNITED STATES PATENT AND TRADEMARK OFFICE
CERTIFICATE OF CORRECTION

PATENT NO.: 6,139,308
DATED: October 31, 2000
INVENTOR(S): Michael R. Berrigan et al.

It is certified that error appears in the above-identified patent and that said Letters Patent is hereby corrected as shown below:

Column 18, line 32, "product" should read --produce--

Signed and Sealed this

Fifteenth Day of May, 2001

*Attest:*

NICHOLAS P. GODICI

*Attesting Officer*    *Acting Director of the United States Patent and Trademark Office*